United States Patent [19]

Waddill

[11] 4,189,564
[45] Feb. 19, 1980

[54] NON-CRYSTALLIZING EPOXY RESIN ACCELERATOR

[75] Inventor: Harold G. Waddill, Austin, Tex.

[73] Assignee: Texaco Development Corporation, White Plains, N.Y.

[21] Appl. No.: 952,868

[22] Filed: Oct. 19, 1978

[51] Int. Cl.$^2$ ............................................. C08G 59/56
[52] U.S. Cl. ...................................... 528/94; 252/182; 528/111; 528/118; 528/407
[58] Field of Search .................. 528/94, 111, 118, 407; 252/182

[56] References Cited

U.S. PATENT DOCUMENTS

| | | | |
|---|---|---|---|
| 3,740,373 | 6/1973 | Bentley et al. | 260/47 EC |
| 3,875,072 | 4/1975 | Waddill | 252/182 |
| 3,943,104 | 3/1976 | Waddill | 260/47 EN |

Primary Examiner—Earl A. Nielsen
Attorney, Agent, or Firm—Carl G. Ries; Robert A. Kulason; Kenneth R. Priem

[57] ABSTRACT

A novel epoxy resin curing accelerator comprises a mixture of piperazine, N-aminoethylpiperazine (AEP) and triethanolamine (TEA). The resins comprise a vicinal polyepoxide, a curing agent, and an amount of piperazine, AEP and TEA mixture effective for accelerating the cure of the polyepoxide. The accelerator combination is synergistic for accelerating the curing of an epoxy resin cured with an amine at ambient or elevated temperatures. The epoxy resin products are useful in protective coatings, adhesives, seamless and terrazzo flooring, castings, laminates, and in grouting, potting, encapsulating, caulking and sealing compositions.

11 Claims, No Drawings

NON-CRYSTALLIZING EPOXY RESIN ACCELERATOR

BACKGROUND OF THE INVENTION

1. Field of the Invention

This invention relates to curable epoxy resins. More particularly, to a novel curing accelerator.

2. Prior Art

Epoxy resins constitute a broad class of polymeric materials having a wide range of physical characteristics. The resins are characterized by expoxide groups which are cured by reaction with certain catalysts or curing agents to provide cured epoxy resin compositions with certain desirable properties. One such class of curing agents are generally the amines. The most commonly used amine curing agents are aliphatic amines such as diethylenetriamine, triethylenetetramine and the like and/or polyoxyalkylene polyamines; such as polyoxypropylenediamines and triamines.

Epoxy resin compositions having improved physical properties are obtained by employing polyoxyalkyleneamines, and polyoxyalkylenediamines in particular, as curing agents. It is common to employ with such epoxy resin compositions a co-curing agent such as those described in U.S. 3,549,592.

Also known to be effective as epoxy curing agents or co-curing agents are various ureas and substituted ureas, such as those disclosed in U.S. Pat. No. 3,294,749, U.S. Pat. No. 2,713,569, U.S. Pat. No. 3,386,956, U.S. Pat. No. 3,386,955, U.S. Pat. No. 2,955,372 and U.S. Pat. No. 3,639,338. The ureas disclosed in the above references are useful as either curing agents or as curing accelerators.

Aliphatic or aromatic compounds having a single terminal ureido group are well known. It has been disclosed in U.S. Pat. No. 2,145,242 to Arnold that diureido terminated aliphatic compounds can be produced by reacting an aliphatic diamine wherein each terminal amine has at least one labile hydrogen with urea. Other substituted ureas are disclosed in U.S. Pat. No. 3,965,072.

Diureide terminated polyoxyalkylene material provides cured epoxy resin compositions exhibiting outstanding strength of adhesion as disclosed in co-pending application Ser. No. 743,814 filed Nov. 22, 1976.

In several applications, accelerated curing of epoxy resins at ambient temperatures is necessary. A typical example is the use of an epoxy resin as an adhesive in a flammable environment. Curing with many prior art amines may be too slow for this and other specific situations.

My U.S. Pat. Nos. 3,875,072 and 3,943,104 disclose an accelerator comprising piperazine and an alkanolamine. This accelerator combination has one disadvantage. It tends to crystallize at low temperatures, thus reducing its usefulness in some cases.

The present invention is an accelerator which shows a lessened tendency to crystallize at low temperatures.

SUMMARY OF THE INVENTION

According to one aspect of the instant invention, the amine cure of an epoxy resin is accelerated with a combination of piperzine, aminoethylpiperazine (AEP) and an alkanolamine. In a preferred aspect the alkanolamine is triethanolamine (TEA).

In another aspect, a curable epoxy resin composition comprises a vicinal polyepoxide, a curing agent and an amount of piperazine, N-aminoethylpiperazine and alkanolamine combination effective for accelerating the cure of the polyepoxide.

The invention also comprises the accelerator combination.

DETAILED DESCRIPTION OF THE INVENTION

According to one embodiment of the instant inventive concept, blends of a polyepoxide, a curing agent and a combination of piperazine, N-aminoethylpiperazine and an alkanolamine are thoroughly admixed and cured in accordance with conventional methods to provide cured epoxy resins having excellent properties.

Generally the vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2',3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which are in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins,* McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The amine curing agents which can be utilized in accordance with the instant invention are generally any of those amine curing agents which are well known to be useful for the curing of vicinal epoxides. Generally, those curing agents having at least three reactive amino hydrogens are useful.

Exemplary of those amines which can be utilized are alkylene polyamines such as diethylene triamine, triethylene tetramine and the like; oxyalkylene polyamines such as polyoxypropylene, di- and triamine and diamino derivatives of ethylene glycol, such as 1,13-diamino 4,7,10-trioxatridecane.

Additionally, aromatic amine curing agents are useful, such as the alkylene-linked polyphenyl amines, phenylene diamines and polycyclic or fused aromatic primary amine compounds. Additionally the corresponding cycloaliphatic compounds can be used.

Likewise, the polyamide curing agents such as the condensation products of polyamines and polycarboxylic acids are useful. Suitable such amide compounds are, for example, the condensation product of a polyamine and a dimerized fatty acid produced in accordance with U.S. Pat. No. 2,379,413.

Of the amine curing agents known to be effective in curing a vicinal epoxy resin, preferred curing agents in accordance with the instant invention are the polyoxyalkylene containing amine compounds. A preferred class of polyoxyalkylene polyamines is depicted by the formula:

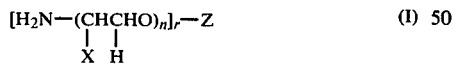

wherein X is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4. The most preferred polyoxyalkylene polyamines are the polyoxypropylene diamines wherein X is a methyl radical, n is a number from 1 to 10, Z is a 1,2-propylene radical and r is about 2. These polyoxyalkylene polyamines can be prepared by known methods as disclosed in U.S. Pat. No. 3,236,895 and U.S. Pat. No. 3,654,370. The most preferred polyoxyalkylene polyamine is a polyoxypropylene diamine having a molecular weight of about 230.

Another preferred class of polyoxyalkylene polyamines can be depicted by the formula:

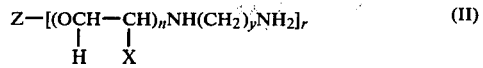

wherein X, Z, n and r are defined as above and y is 2 or 3. These poly(aminoalkylamino)polyethers are the hydrogenated product of the cyanoalkylated adduct of a polyoxyalkylene polyamine as above described. The preparation of the cyanoalkylated adducts is described in U.S. Pat. No. 3,666,788 issued to Rowton, May 30, 1972.

My U.S. Pat. Nos. 3,875,072 and 3,943,104 disclose an accelerator combination comprising piperazine and an alkanolamine. An improvement in crystallizing tendency over the above will take place once any amount of N-aminoethylpiperazine is present with a piperazine, alkanolamine mixture. Therefore, my invention includes mixtures of piperazine, N-aminoethylpiperazine (AEP) and an alkanolamine where AEP is present.

However, I have found that the accelerator combinations of piperazine, N-aminoethylpiperazine and an alkanolamine is best utilized in approximately the following weight percentages:

|  | Broad, wt. % | Preferred, wt. % |
| --- | --- | --- |
| piperazine | 5 to 30 | 15 to 20 |
| AEP | 5 to 50 | 5 to 20 |
| Alkanolamine | 50 to 85 | 60 to 75 |

My related application Ser. No. 952,867 filed of even date concerns an accelerator combination containing N-aminoethylpiperazine and an alkanolamine.

Examples of preferred alkanolamines useful in the invention include mono-, di- and triethanolamine, hydroxy ethoxyethylamine, N-aminoethylethanolamine, N, N bis (hydroxypropyl), N-hydroxyethylamine, and the like. Triethanolamine is especially preferred.

The particular order of mixing of the above described components is not critical in the practice of the instant invention. For example, the amine curing agent, piperazine, N-aminoethylpiperazine and alkanolamine components may be blended in any desired order or manner to provide a homogenous mixture of accelerated curing agents. The mixture may then be incorporated into or mixed with the above described resin component at time of use to give an accelerated self-curing resin at ambient temperature.

In a preferred method of practicing the invention, the piperazine, N-aminoethylpiperazine and alkanolamine components are first blended. The blend is then added to the amine curing agent component and this overall mixture is finally admixed with the above-described resin component at time of use. The blend of piperazine, N-aminoethylpiperazine and alkanolamine component is capable of being stored for long periods of time, even at low temperatures.

I have found that the utilization of these three components is highly synergistic for accelerating the self-curing of the above-described epoxy resin types cured with said amine curing agents at ambient temperature.

The combined weight of piperazine, N-aminoethylpiperazine and alkanolamine components present when mixed with the polyoxyalkylenepolyamine may range from about 1 to 100 parts by weight per 100 parts by weight of the polyoxyalkylenepolyamine. The optimum amount may vary somewhat for a given application depending upon the particular epoxy resin, polyoxyalkylenepolyamine and alkanolamine being utilized, and is best determined empirically for the most effective amount.

In the curing of epoxy resins, the curing-hardening agent is usually added in an amount that will provide one reactive —NH in the combined hardener-curing components for each epoxy group in the epoxy resin component. These are known in the art as stoichiometric quantities. Usually the stoichiometric quantities can be calculated from a knowledge of the chemical structure and analytical data on the particular components being utilized. However, many times the stoichiometric quantity is found empirically. A particular example of such a method is measuring the maximum exotherm temperature during the curing of the epoxy resin at different hardening-curing agent concentrations. A graph of the exotherm temperature vs. the concentration of hardening-curing agent will exhibit a maximum at or near the stoichiometric quantity.

For the purposes of the instant invention, the stoichiometric amount of the hardening-curing agent is calculated by adding together the number of equivalents on the basis of weight per replaceable —NH group in the amine curing agent, piperazine, N-aminoethylpiperazine and alkanolamine components utilized. Preferably, these components are utilized in amounts that will provide up to 10 percent excess of the stoichiometric amount.

Should fire retardance be required for the epoxy resins cured by the process and composition of the present invention, it will be understood that various fire retardants for epoxy resins in compositions known in the art can be utilized without departing from the intended scope of the invention. Experiments have shown that well known epoxy resin fire retardants, for example, various halogenated compounds, phosphate compounds, even including piperazine phosphate, and the like, can be utilized in effective amounts in the above-described inventive process without affecting the synergistic effect of the accelerator combination of piperazine, N-aminoethylpiperazine and alkanolamine components upon the accelerated curing rate. Preferably, where fire retardance is desirable, an effective amount of piperazine phosphate is incorporated into the above-described mixture. Accordingly, the piperazine phosphate may be added at any time during the mixing of the components without affecting the described synergistic effect.

The above-described mixture of epoxy resin, amine curing agent, and accelerator combination of piperazine, N-aminoethylpiperazine and alkanolamine is also preferably allowed to self-cure at ambient temperatures of between about 0° to about 45° C. However, the mixture can be cured or post-cured at elevated temperatures up to about 175° C., if desirable and convenient.

The following Examples and Tables illustrate the practice of the invention in more detail but are not to be construed as limitative.

| Formulation | A | B | C | D | E | F |
|---|---|---|---|---|---|---|
| Epoxy resin (EEW 185)[1] | 100 | 100 | 100 | 100 | 100 | 100 |
| JEFFAMINE ®D-400[2] | 50 | 50 | 50 | 50 | 50 | 50 |
| Piperazine | 3.0 | 2.5 | 2.0 | 2.0 | 2.5 | 2.0 |
| AEP | — | 0.5 | 0.5 | 1.0 | 1.0 | 2.0 |
| TEA | 7.0 | 7.0 | 7.5 | 7.0 | 6.5 | 6.0 |
| Brook visc., cps., R.T. | 750 | 800 | 750 | 700 | 700 | 700 |
| Gel time, mins. (200g. mass) | 50.8 | 51.2 | 51.5 | 47.8 | 48.5 | 45.0 |
| Peak exotherm, °C. | 168.5 | 162.0 | 168.5 | 174.0 | 169.5 | 183.5 |
| Time to peak temp., mins. | 67.5 | 67.0 | 65.0 | 61.0 | 62.0 | 57.5 |

Crystallization of accelerators on storage at 0° for about 14 days
Accelerator of Formula A: Small amount of crystals
None of the other accelerators crystallized.
[1]Diglycidyl ether of isopropylideneidiphenol having an equivalent weight per epoxide of 185.
[2]JEFFAMINE ® product manufacture by Jefferson Chemical Company, Inc., a polyoxypropylenediamine of structure I having an average molecular weight of about 400.

EXAMPLE II

The following data demonstrates that a three (3) component accelerator comprising piperazine, triethanolamine and N-aminoethylpiperazine has less tendency to crystallize at low temperatures than a two (2) component accelerator comprising piperazine and triethanolamine.

| Composition | A | B | C |
|---|---|---|---|
| Piperazine | 30 | 25 | 20 |
| Triethanolamine | 70 | 70 | 75 |
| N-aminoethylpiperazine | — | 5 | 5 |
| Crystallization- | | | |
| Storage at 5° C., glass or metal | | | |
| 24 hrs. | None | None | None |
| 4 days | 1 | 1 | None |
| 7 days | 1 | 1 | None |
| 14 days | 1 | 1 | None |
| 21 days | 2 | 1 | None |
| 28 days | 2 | 1 | None |
| Storage at −20° C., glass | | | |
| 24 hrs. | 1 | 1 | None |
| 4 days | 1 | 1 | 4 |
| 7 days | 1 | 1 | 4 |
| 14 days | 2 | 2 | 4 |
| 21 days | 2 | 2 | 4 |
| 28 days | 3 | 2 | 4 |
| Storage 26 −20° C., metal | | | |
| 24 hrs. | None | None | None |
| 4 days | 1 | 1 | 4 |
| 7 days | 1 | 1 | 4 |
| 14 days | 2 | 2 | 4 |
| 21 days | 2 | 2 | 4 |
| 28 days | 2 | 2 | 4 |

[1]Few crystals
[2]Numerous crystals
[3]Large amount crystals
[4]Very few crystals

EXAMPLE III

This example shows the lessened tendency of the three (3) component accelerator system (as in Example II) but here mixed with an epoxy curing agent, JEFFAMINE ®D-230, a polyoxypropylenediamine of structure I having an average molecular weight of about 230 (65% D-230, 35% accelerator).

| Composition of Accelerator | A | B | C |
|---|---|---|---|
| Piperazine | 30 | 25 | 20 |
| Triethanolamine | 70 | 70 | 75 |
| N-aminoethylpiperazine | — | 5 | 5 |
| Storage at 25° C., glass | | | |
| 24 hrs. | 4 | None | None |
| 4 days | 4 | None | None |
| 7 days | 1 | None | None |
| 14 days | 1 | None | None |
| 21 days | 2 | None | None |
| 28 days | 2 | None | None |
| Storage at 5° C., glass | | | |
| 24 hrs. | 1 | None | None |
| 4 days | 2 | 2 | None |
| 7 days | 2 | 2 | None |
| 14 days | 3 | 3 | None |
| 21 days | 3 | 3 | None |
| 28 days | 3 | 3 | None |
| Storage at −20° C., glass | | | |
| 24 hrs. | 1 | 1 | None |
| 4 days | 1 | 1 | 4 |
| 7 days | 2 | 2 | 4 |
| 14 days | 3 | 3 | 1 |
| 21 days | 3 | 3 | 1 |
| 28 days | 3 | 3 | 1 |

I claim:

1. As a composition of matter, an accelerator combination for accelerating the curing of a polyglycidyl ether of a polyhydric phenol cured with an amine, said accelerator combination comprising piperazine, N-aminoethylpiperazine and an alkanolamine.

2. A composition as in claim 1 wherein the components are present in amounts ranging from about 5 to 30 weight percent piperazine, about 5 to 50 weight percent N-aminoethylpiperazine and about 50 to 85 weight percent alkanolamine.

3. An accelerator combination of claim 1 wherein said alkanolamine is selected from the group consisting of mono-, di-, or triethanolamine, hydroxy ethoxyethylamine, N-aminoethylethanolamine, N,N-bis(hydroxypropyl), N-hydroxyethylamine, and mixtures thereof.

4. An accelerator combination of claim 1 wherein the alkanolamine is triethanolamine.

5. In a process for curing a polyglycidyl ether of a polyhydric phenol with an amine curing agent by combining a polyglycidyl ether of a polyhydric phenol with an amine curing agent, the improvement which comprises:

accelerating said curing by addition of an accelerator combination of piperazine, N-aminoethylpiperazine and an alkanolamine.

6. A process as in claim 5 wherein the accelerator components are present, in amounts ranging from about 5 to 30 weight percent piperazine, about 5 to 50 weight percent N-aminoethylpiperazine and about 50 to 85 weight percent alkanolamine.

7. A process according to claim 5 wherein the accelerator combination is added in an amount of between about 1 to 100 parts by combined weight per 100 parts by weight of said amine curing agent.

8. A process according to claim 5 wherein said amine curing agent is a polyoxypropylenediamine.

9. A process according to claim 5 wherein the alkanolamine is a mono-, di-, or triethanolamine.

10. A process according to claim 8 wherein said polyoxyalkylenediamine has an average molecular weight of about 230 to about 400.

11. A process according to claim 10 wherein the accelerator combination is added in an amount of between about 1 to 100 parts by combined weight per 100 parts by weight of said polypropylenediamine.

* * * * *